United States Patent
Crandall et al.

(10) Patent No.: US 10,824,748 B2
(45) Date of Patent: Nov. 3, 2020

(54) METHOD AND SYSTEM FOR LOW OVERHEAD CONTROL/STATUS HANDSHAKE FOR REMOTE SHARED FILE SERVER

(71) Applicants: Carl R Crandall, Eagan, MN (US); Robert M Malek, Eagan, MN (US); Ravi Kumar Rao, Bangalore (IN); Souvik Das, Bangalore (IN); Manish Ranjan Mahanta, Bangalore (IN)

(72) Inventors: Carl R Crandall, Eagan, MN (US); Robert M Malek, Eagan, MN (US); Ravi Kumar Rao, Bangalore (IN); Souvik Das, Bangalore (IN); Manish Ranjan Mahanta, Bangalore (IN)

(73) Assignee: Unisys Corporation, Blue Bell, PA (US)

( * ) Notice: Subject to any disclaimer, the term of this patent is extended or adjusted under 35 U.S.C. 154(b) by 286 days.

(21) Appl. No.: 15/933,662

(22) Filed: Mar. 23, 2018

(65) Prior Publication Data
US 2019/0258810 A1    Aug. 22, 2019

(51) Int. Cl.
| | |
|---|---|
| *G06F 16/17* | (2019.01) |
| *G06F 21/62* | (2013.01) |
| *G06F 9/50* | (2006.01) |
| *G06F 16/11* | (2019.01) |

(52) U.S. Cl.
CPC ........ *G06F 21/6209* (2013.01); *G06F 9/5027* (2013.01); *G06F 16/122* (2019.01); *G06F 16/1734* (2019.01)

(58) Field of Classification Search
CPC .................................................... G06F 16/1734
USPC ......................... 707/822, 705, 782; 709/217
See application file for complete search history.

(56) References Cited

U.S. PATENT DOCUMENTS

| | | | | |
|---|---|---|---|---|
| 6,850,955 | B2* | 2/2005 | Sonoda | G06F 3/0619 |
| 7,424,491 | B2* | 9/2008 | Sonoda | G06F 3/0619 |
| 7,823,145 | B1* | 10/2010 | Le | G06F 21/577 |
| | | | | 709/203 |
| 8,522,228 | B1* | 8/2013 | Le | G06F 8/61 |
| | | | | 717/168 |
| 2003/0105767 | A1* | 6/2003 | Sonoda | G06F 3/0619 |
| 2005/0060330 | A1* | 3/2005 | Sonoda | G06F 3/0619 |

* cited by examiner

Primary Examiner — Baoquoc N To

(57) ABSTRACT

A method and system for providing a plurality of host systems shared access to data files from a file server. The method includes monitoring a control file for updates, the control file located within a corresponding host directory located within the file server; receiving a request for access to a data file stored on the file server, the access request being written to the control file, the access request including a requested data file operation; performing the requested data file operation in response to the control file being updated with the access request; creating a status file in the host directory in which the requested data file operation was performed upon completion of the requested data file operation; writing status data in the status file, the status data including a result of the performance of the requested data file operation; and allowing access to the host directory in which the requested data file operation was performed in response to the status data being written to the status file.

20 Claims, 3 Drawing Sheets

METHOD AND SYSTEM FOR LOW OVERHEAD CONTROL/STATUS HANDSHAKE FOR REMOTE SHARED FILE SERVER

BACKGROUND

Field

The instant disclosure relates generally to computer system architecture, and in particular to methods and systems for reduced overhead in the control and status response for a shared file server system and similar environments.

Description of the Related Art

With the advent of multiple application servers in both physical systems and in virtual machines (VMs) running on a hypervisor, there is a need for access to a common set of files, e.g., for exchanging data and possibly for software loading. One option for providing access to a common set of files is the use of shared disks. However, the use of shared disks exposes all of the file data to all users all the time. The use of shared disks also requires some type of locking between computing applications accessing the files to prevent data corruption of the shared files.

Another option for providing access to a common set of files is the use of a file server. A file server typically is a computer or other computing device, attached to a network, that provides a location for shared storage of computer files that can be accessed by host systems also attached to the network. The use of a file server allows some control over the access of each file and also can control the overlapping of requests to a single file. One way to control the access to the files using a file server is for host systems to send messages or connect to the file server, which allows the use of an application programming interface (API) call, such as a REST API call, which defines a set of data functions that can be performed via the Hypertext Transfer Protocol (HTTP).

However, sending messages or connecting to a conventional file server typically results in a relatively large amount of overhead for the connection and the message handling. Sending messages or connecting to a conventional file server also requires the transfer of the file data via the message passing protocol. One way to reduce this overhead is to perform a remote mount of the file system directories via a protocol like CIFS/SMB (Common Internet File System/Server Message Block) to provide direct access to the desired files. However, there is still a need for some method to request the file server to make the desired file data visible in the connected directory.

There is a need for a relatively low overhead method and system to inform a file server of a file needed, and to provide a response when the file is available. Such system and method should require suitable security, fault detection and reporting.

SUMMARY

Disclosed is a method and system for providing a plurality of host systems shared access to data files from a file server. The method includes monitoring by a control file write detector component within the file server a control file for updates, wherein the control file is located within a corresponding host directory located within the file server. The method also includes receiving from a host system coupled to the file server a request for access to a data file stored on the file server, wherein the access request is written to the control file, wherein the access request includes a requested data file operation. The method also includes performing the requested data file operation in response to the control file being updated with the access request. The method also includes creating a status file in the host directory in which the requested data file operation was performed upon completion of the requested data file operation. The method also includes writing status data in the status file, wherein the status data includes a result of the performance of the requested data file operation. The method also includes allowing access by the host system to the host directory in which the requested data file operation was performed in response to the status data being written to the status file.

DETAILED DESCRIPTION

Figure 1:
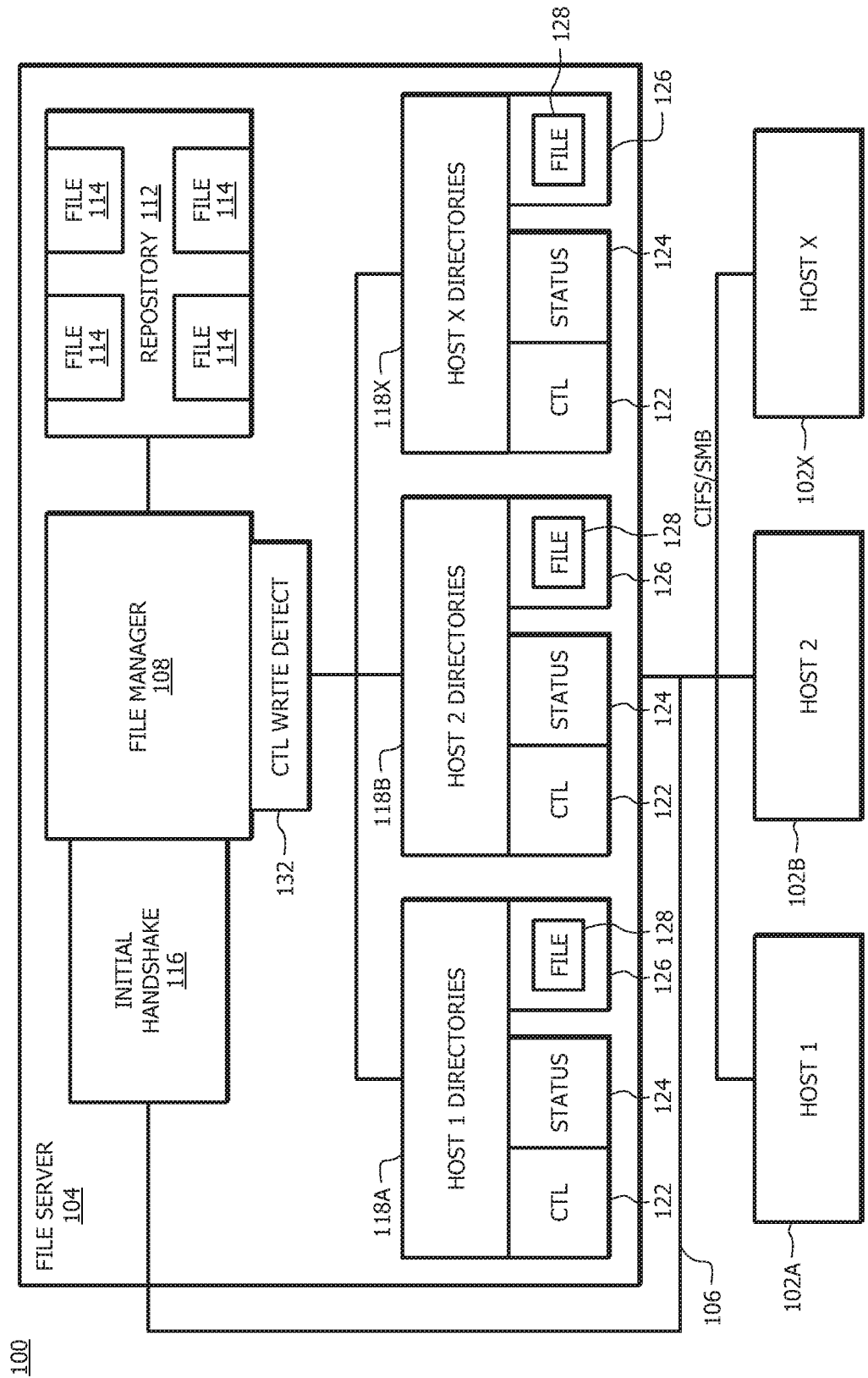
FIG. 1 is a schematic view of a system for providing reduced overhead in the control and status response for a shared file server, according to an embodiment.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting, and merely set forth some of the many possible embodiments for the claimed invention.

In a conventional computing network configuration, a plurality of host systems (i.e., clients) can connect to a conventional file server via a File Transfer Protocol (FTP) or a Common Internet File System/Server Message Block (CIFS/SMB) type interface to gain access to the data files stored on the file server. The File Transfer Protocol uses separate control and data connections between the host system and the server. Thus, using an FTP type interface, a host system sends a message to the file server requesting a particular data file. In response, the file server sends the requested data file to the host system as a group of messages.

The CIFS/SMB protocol also works through a client-server approach, where the host system makes specific requests and the file server responds accordingly. The CIFS/SMB type interface gives a host system access to all of the data files in a requested or selected directory structure stored on the file server. The requested directory and the data files in the requested directory appear to the host system the same as local files on the storage disk of the host computing device. With a CIFS/SMB type interface, the message transfers across the network connection between the host system and the file server are handled by underlying CIFS/SMB software, and CIFS/SMB protocols to keep the files in sync.

The data files visible on the file server are placed there by a manual setup, e.g., by a network administrator. Alternatively, the data files visible on the file server are placed there via an automated process, e.g., via socket messages through a set of network protocol layers (i.e., the network stack).

FIG. 1 is a system 100 for providing reduced overhead in the control and status response for a shared file server, according to an embodiment. The system 100 includes a file server 104 and a plurality of Users or host systems 102 (e.g., host system 102a, host system 102b, host system 102x, etc.) that are to access shared files from the file server 104. The host systems 102 are connected to the file server 104 via a communication network connection 106, such as one or more Ethernet connections.

Each host system 102 can be a standalone computing device, machine or system, or a group of standalone computing devices, machines or systems. Regardless of the particular configuration of each host system 102, it should be understood that the relationship between each host system 102 and the file server 104 is a machine-to-machine connection, and involves machine-to-machine communications, i.e., the exchange of data between machines.

The file server 104 includes a file manager 108, which controls the operation of the file server 104. The file server 104 also includes a repository 112, which holds one or more shared files 114. The file server 104 also includes an initial handshake handler 116, which listens for new connections (e.g., handshake packets) from one or more of the host systems 102. The initial handshake handler 116 also validates the connection information received by the host systems 102.

The file server 104 also includes a set of directories or host directories 118, i.e., a directory for each connected host system 102 (e.g., host directory 118a, host directory 118b, host directory 118x, etc.). Each host directory 118 includes a control file (CTL) 122, a status file 124, and a space 126 for requested files 128. The file server 104 also includes a control file write detector 132, which detects requests for service from the host systems 102.

According to an embodiment, CIFS/SMB connections are used to make requested directories and data files appear like local directories and data files in the file system of the host system 102. However, rather than requiring a separate message passing interface via the network stack, as in conventional configurations, the file server 104 monitors access to the CTL file 122 to determine when a new operation to request the movement of files from/to the repository 112 to/from the host system 102 visible directories is needed.

According to an embodiment, the host system 102 writes the file information to the CTL file 122, like any other file, and waits for the appearance of the status file 124 to read the results of the request. The control file write detector 132 in the file server 104 detects the file write, reads the information, performs the operation by moving the data file to/from the proper directory, and creates the status file 124 with the results of the operation. The host system 102 then reads/writes the data file as if the data file was stored on the local storage disk of the host system 102. Therefore, according to an embodiment, the CTL file 122, the status file 124 and the data files 128 in the host directory 118 all appear to both the host system 102 and the file server 104 as local files on their respective storage disks.

In this manner, according to an embodiment, the overhead associated with maintaining a network stack socket open to transfer control and status messages between the file server and the host system is eliminated. Therefore, according to an embodiment, less memory management is required by the applications of the host system 102 using the requested data files.

According to an embodiment, in operation, each host system 102 is given the network address of the file server 104. When a particular host system 102 is ready to establish a connection with the file server 104, the host system 102 creates an initial handshake packet. The initial handshake packet is a connection request that includes the name of the host system 102, the serial number/identification of the host system 102, a protocol version, one or more activation keywords and a directory structure (i.e., a list of directories) for storing the desired data file(s) in the host directory 118 that was created in the file server 104. The list of host directories is provided to allow the host system 102 to subdivide at least a portion of a workspace of the host system 102 for use by different applications of the host system 102. The list of host directories also can be provided to allow the host system 102 to subdivide at least a portion of the workspace of the host system 102 for use as one or more virtual tape drives.

Once the host system 102 creates the initial handshake packet, the host system 102 sends the initial handshake packet, as part of a request for connection, to the initial handshake handler 116 of the file server 104 via an encrypted protocol. As discussed hereinabove, the initial handshake handler 116 is listening for new connections from one or more of the host systems 102. The initial handshake handler 116 validates the received handshake packet.

If the received handshake packet is valid, the initial handshake handler 116 requests the file manager 108 to create a directory structure requested by the host system 102 in its initial handshake packet. The initial handshake handler 116 also requests the file manager 108 to create a unique user identification and password for the host system connection. The initial handshake handler 116 also requests the file manager 108 to create a control file (CTL) 122 in each host directory 118. Appropriate file sharing and security is set for the created host directories 118 using the unique user identification and password that were created.

The file manager 108 then enables the control file (CTL) write detector 132 for each control (CTL) file 122 that was created. The file manager 108 then queues up an administrator request for access confirmation. The initial handshake handler 116 then returns to the requesting host system 102 a response packet that includes the user identification and password, the protocol version, the activation keywords and the directory structure to which the host system 102 should attach.

Once the requesting host system 102 receives the response packet, the host system 102 decodes the response packet and attempts to make an encrypted remote connection to the file server 104 using the CIFS/SMB protocol (or other suitable protocol), and using the user identification, the password and the directory structure decoded from the response packet. If the encrypted remote connection from the host system 102 to the file server 104 is successful, the host system 102 is then able to see the host directories 118 and the control files (CTLs) that were created in the file server 104.

Once this initial handshake is completed, the host system 102 has access to the created file structure, but the host system 102 is not allowed to access the files in the created file structure until such access is approved by the administrator. This restriction of access allows a possible manual administrator approval process to be kept separate from the automated connection process. The file manager 108 then checks a list of preapproved host systems. If the requesting host system 102 is not on the list of preapproved host systems, the file manager 108 requests the administrator for appropriate approval before allowing access to the files 114 in the repository 112 and having them moved to the host directory 118 for access by the host system 102.

After the initial handshake has been completed, there exists a set of host directories 118 (i.e., a host directory 118 for each host system 102), with a control (CTL) file 122 in each of the host directories 118. Each control file 122 is registered with the control file write detector 132 so that the control file write detector 132 is alerted when any of the control files 122 have been updated. Data for each control file 122 includes a format control field, a command/action field, a data file name field, a write protect flag, and a constant/check field.

The command/action field contains the type of operation the corresponding host system 102 is requesting. Such commands or actions include mounting or moving a file 114 from the repository 112 into the host directory 118, returning a file 128 from the host directory 118 back to the repository 112, and erasing or deleting particular files from the repository.

The host system 102 writes the command/action data to the control file 122, which triggers the control file write detector 132 to read the control file 122 and to present the command/action data to the file manager 108. The file manager 108 validates the command/action data, determines the location of the requested file, and then performs the requested action, e.g., moving the file data 114 from/to the repository to/from the host directory 118.

When the requested action is completed, the file manager 108 creates a status file 124 in the corresponding host directory 118, and writes status data into the status file 124. The status file 124 includes a format key field and a set of result and error code fields for status data. The host system 102, which is monitoring for the existence of the status file 124, reads the status data in the status file 124 when the status file 124 is detected as being present. If the host system 102 reads the status data in the status file 124 and the response indicates successful completion of the command/action, the host system 102 then executes read/write actions to the data file (which has been moved to the host directory 118).

The file manager 108 can make as many checks of the command/action data as desired, including responses for files that are mounted in another host directory 118, checking for file integrity, checking for internal errors, and checking for data files that are missing. The status file 124 returned from the file manager 108 can contain unique code values to allow the host system 102 to determine an appropriate type of recovery action, if necessary.

When the host system 102 has read the status file 124, the status file 124 is then deleted to prepare the host directory 118 for the next control file 122 write action. The host system 102 will not write the control file 122 with new data if the host system 102 has not received a status file 124. If the host system 102 detects a status file 124 when the host system 102 does not expect to receive a status file 124, the host system 102 logs the received status file 124 as an error, deletes the received status file 124, and then writes the control file 122 with a new request.

As discussed hereinabove, conventionally, for a host system to gain access to data files stored on a conventional file server, socket connections and message memory buffers initially must be created. The host system then creates a file move message and posts the file move message to the network stack. The file server receives the file move message from the socket, decodes the file move message, manages the message memory buffers, and performs the file move operation. The file server then generates a response status message and posts the response status message to the network stack. The host system then detects the response status message, decodes the response status message, manages the response status message within the message memory buffers, and then accesses the data file from the file server.

As discussed hereinabove, according to an embodiment, the host system creates a file move message or other data file operation, opens the CTL file, and writes the file move message to the CTL file. The file server monitor detects the CTL file write, reads the file move information from the CTL file, performs the file move operation, opens the status file, and writes the results of the file move operation to the status file. The host system, after writing the CTL file, checks for the existence of the status file. When the status file appears, the host system reads the status file and deletes the status file. The data file is then ready for read/write by the host system.

Figure 2:
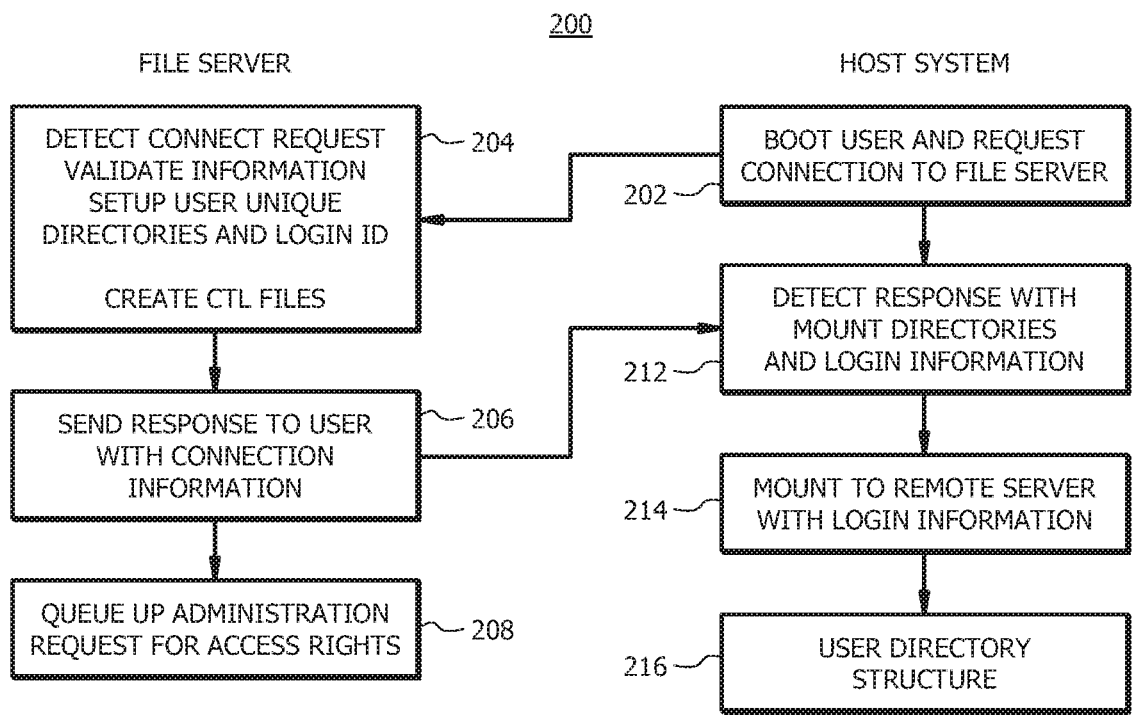
FIG. 2 is a flow diagram of the initial setup operation for a method for providing reduced overhead in the control and status response for a shared file server, according to an embodiment.

FIG. 2 is a flow diagram 200 of the initial setup operation for a method for providing reduced overhead in the control and status response for a shared file server, according to an embodiment. The flow diagram 200 illustrates the functions performed by the file server and by the host system.

Initially, as shown in a step 202, once the host system is booted, the host system requests a connection to the file server. As shown in a step 204, the file server detects the connection request from the host system, and validates the information contained within the host system connection request. The file server then sets up within the file server unique host directory structure(s) for the host system to access. The file server also sets up an appropriate login identification for the host system. The file server also creates a control (CTL) file within each host directory.

As shown in a step 206, the file server then sends a response to the host system with the appropriate connection information, including the login identification for the host system. As shown in a step 208, the file server then queues up a request to the network administrator for access rights by the host system.

As shown in a step 212, the host system detects the response from the file server and decodes the file server response, including the directory structure that has been set up in the file server and the host system login information. As shown in a step 214, the host system then connects (i.e., mounts) to the file server with the decoded login information. As shown in a step 216, the host system now has access to the file directories that have been set up in the file server.

Figure 3:
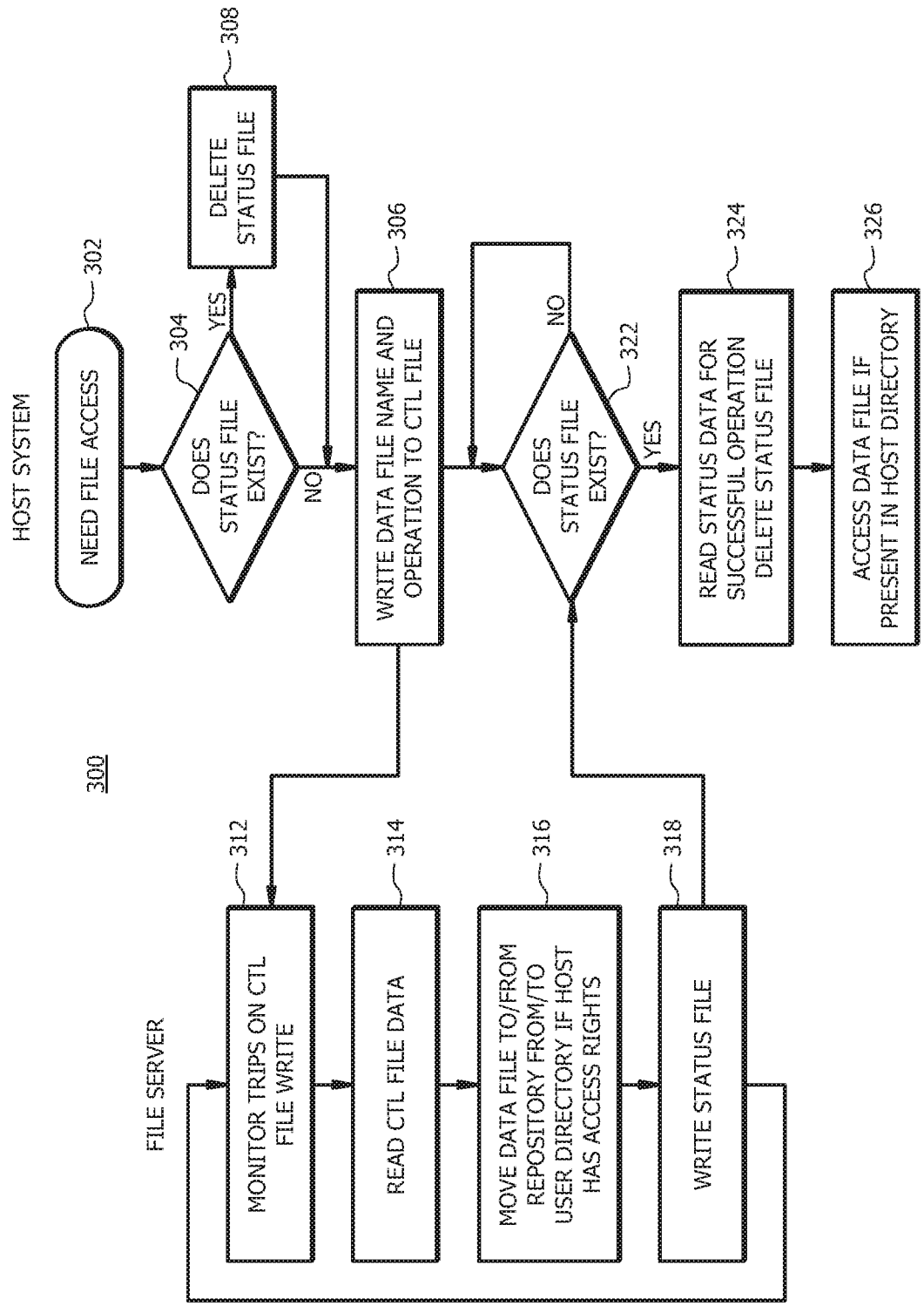
FIG. 3 is a flow diagram of the data file mount/unmount portion of a method for providing reduced overhead in the control and status response for a shared file server, according to an embodiment.

FIG. 3 is a flow diagram 300 of the data file mount/unmount portion of a method for providing reduced overhead in the control and status response for a shared file server, according to an embodiment. The flow diagram 300 illustrates the functions performed by the file server and by the host system.

Once the setup operation shown in FIG. 2 has been completed, the data file mount/unmount portion of the method begins when the host system needs access to one or more data files within the file server, shown as a step 302. As shown in a step 304, the host system looks for the existence of a status file that may have been created within the file server. If the host system determines that the status file does not exist (N), the host system writes the requested data file name and requested data file access operation to the CTL file in the file server, as shown in a step 306. If the host system determines that the status file does exist (Y), the host system reads the status file and then deletes the status file (to prepare the host directory for the next control file write action), shown as a step 308.

Meanwhile, the file server, via its control file write detector, monitors the CTL file for the presence of any written file mount commands and actions, as shown in a step 312. When the control file write detector within the file server detects file mount commands and actions in the CTL file, the file server reads the CTL file data, as shown in a step 314. The file server then executes the requested file mount commands and actions, i.e., the file server moves the requested data file(s) from/to the repository in the file server to/from the appropriate host directory, as shown in a step 316. The file server executes the requested file mount commands and actions assuming the host system has the appropriate access rights (see the step 208, discussed hereinabove).

Assuming the host system has the appropriate access rights, once the file server executes the requested file mount commands and actions, the file server writes a status file into the corresponding host directory, shown as a step 318.

Meanwhile, after the host system has written the requested data file name and requested data file access operation to the CTL file in the file server (step 306), the host system begins looking for the existence of a status file in the host directory for which the host system requested access, shown as a step 322. If the host system does not detect the existence of a status file (N), the host system continues to look for the existence of a status file.

If the host system detects the existence of a status file (Y), the host system reads the status data in the status file for a successful data mount operation, and then deletes the status file, shown as a step 324. The host system then can access the requested data files in the requested host directory, as shown in a step 326.

In general, the file manager 108 typically includes a suitable user interface (e.g., some type of web page or other suitable user interface) to allow for the administrator to detect the need for a new host connection, and to approve or reject such host connection request. The user interface also allows for files from other sources to be moved into or out of the repository 112.

The file server 104 also can include other features, such as displaying a host connection status, displaying the location of files in the file server 104 (e.g., files in the repository 112 or mounted in a host directory file 128). Also, operation logs and error logs are useful for managing the file server 104.

It will be apparent to those skilled in the art that many changes and substitutions can be made to the embodiments described herein without departing from the spirit and scope of the disclosure as defined by the appended claims and their full scope of equivalents.

The invention claimed is:

1. A method for providing a plurality of host systems shared access to data files from a file server, the method comprising:
    monitoring by a control file write detector component within the file server at least one control file for updates, wherein the at least one control file is located within a corresponding host directory located within the file server;
    receiving from a host system coupled to the file server a request for access to a data file stored on the file server, wherein the access request is written to the at least one control file, and wherein the access request includes at least one requested data file operation;
    performing the requested data file operation in response to the at least one control file being updated with the access request;
    creating a status file in the host directory in which the requested data file operation was performed upon completion of the requested data file operation;
    writing status data in the status file, wherein the status data includes a result of the performance of the requested data file operation; and
    allowing access by the host system to the host directory in which the requested data file operation was performed in response to the status data being written to the status file.

2. The method as recited in claim 1, further comprising, in response to receiving by an initial handshake handler component within the file sewer a connection request from the host system:
    creating by a file manager component coupled to the initial handshake handler component at least one host directory based on connection request, and
    creating by the file manager component a control file in the at least one host directory.

3. The method as recited in claim 2, further comprising, in response to receiving by the initial handshake handler component the connection request from the host system, enabling by the file manager component the control fife write detector component to monitor the created control file for updates.

4. The method as recited in claim 1, further comprising, in response to receiving by an initial handshake handler component within the file server a connection request from the host system:
    creating by a file manager component coupled to the initial handshake handler component a unique user identification for the host system for the requested connection between the host system and the file server, and
    creating by the file manager component a password for the unique user identification.

5. The method as recited in claim 4, wherein the requested data file operation is performed only if the access request includes the unique user identification and the password.

6. The method as recited in claim 4, further comprising sending by the initial handshake handler to the host system a response packet, wherein the response packet includes the unique user identification and the password.

7. The method as recited in claim 1, wherein the data file operation includes one of moving the data file from a repository in the file server to the corresponding host directory, moving the data file from the corresponding host directory to the repository, and deleting the data file from the repository.

8. The method as recited in claim 1, wherein the control file data includes a format control field, a command/action field, a data file name field, a write protect flag and a constant/check field, wherein the data file name filed contains the name of the data file for which access is being requested, and wherein the command/action field contains the requested data file operation.

9. The method as recited in claim 8, wherein the control file is considered updated if command/action field data is written into the command/action field.

10. The method as recited in claim 1, further comprising, in response to receiving by an initial handshake handler component within the file server a connection request from the host system, queueing up an administrator confirmation for the access request.

11. The method as recited in claim 10, wherein the host system is allowed access to the host directory in which the requested data file operation is to be performed but the requested data file operation is performed only if the administrator confirmation for the access request is approved and received.

12. A file server for providing to a plurality of host systems shared access to data files via a communication network connection, the file server comprising:
 a control file write detector component for monitoring at least one control file for updates, wherein the at least one control file is located within a corresponding host directory located within the file server;
 an initial handshake component for receiving from a host system coupled to the file server a request for access to a data file stored on the file server, wherein the access request is written to the at least one control file, wherein the access request includes at least one requested data file operation; and
 a file manager component coupled between the initial handshake component and the control file write detector component,
 wherein the file manager component performs the requested data file operation in response to the at least one control file being updated with the access request,
 wherein the file manager component, upon completion of the requested data file operation, creates a status file in the host directory in which the requested data file operation was performed, and
 wherein the file manager component, upon completion of the requested data file operation, writes status data in the status file, wherein the status data includes a result of the performance of the requested data file operation, and
 wherein, in response to the status data being written to the status file, the file server allows access by the host system to the host directory in which the requested data file operation was performed via a machine-to-machine connection between the file server and the host system and using machine-to-machine communications between the file server and the host system.

13. The file server as recited in claim 12, wherein the file manager component, in response to the initial handshake handler component receiving a connection request from the host system:
 creates at least one host directory based on the connection request, and
 creates a control file in the at least one host directory.

14. The file server as recited in claim 13, wherein the file manager component, in response to the initial handshake handler component receiving a connection request from the host system, enables the control file write detector component to monitor the created control file for updates.

15. The file server as recited in claim 12, wherein the file manager component, in response to the initial handshake handler component receiving a connection request from the host system:
 creates a unique user identification for the host system for the requested connection between the host system and the file server, and
 creates a password for the unique user identification.

16. The file server as recited in claim 15, wherein the file manager component performs the requested data file operation only if the access request includes the unique user identification and the password.

17. The file server as recited in claim 15, wherein the initial handshake handler, in response to receiving a connection request from the host system, sends to the host system a response packet, wherein the response packet includes the unique user identification and the password.

18. The file server as recited in claim 12, wherein the data file operation includes one of moving the data file from a repository in the file server to the corresponding host directory, moving the data file from the corresponding host directory to the repository, and deleting the data file from the repository.

19. The file server as recited in claim 12, wherein the control file data includes a format control field, a command/action field, a data file name field, a write protect flag and a constant/check field, wherein the data file name filed contains the name of the data file for which access is being requested, and wherein the command/action field contains the requested data file operation.

20. The file server as recited in claim 19, wherein the control file is considered updated if command/action field data is written into the command/action field.

* * * * *